United States Patent
Lee et al.

(10) Patent No.: US 8,670,406 B2
(45) Date of Patent: Mar. 11, 2014

(54) METHOD AND APPARATUS FOR HANDOVER BETWEEN HETEROGENEOUS NETWORKS USING MOBILE IP

(75) Inventors: Min-ho Lee, Seoul (KR); Young-keun Kim, Incheon (KR); Soo-hong Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 961 days.

(21) Appl. No.: 11/439,233

(22) Filed: May 24, 2006

(65) Prior Publication Data

US 2006/0268784 A1 Nov. 30, 2006

Related U.S. Application Data

(60) Provisional application No. 60/684,190, filed on May 25, 2005.

(30) Foreign Application Priority Data

Jun. 30, 2005 (KR) .................. 10-2005-0058306

(51) Int. Cl.
*H04W 4/00* (2009.01)
*H04L 12/28* (2006.01)
*H04L 12/26* (2006.01)
*H04W 36/00* (2009.01)

(52) U.S. Cl.
USPC ........... 370/331; 370/236; 370/338; 370/401; 455/436; 455/466; 455/439

(58) Field of Classification Search
USPC .................................. 370/331, 236
See application file for complete search history.

(56) References Cited

U.S. PATENT DOCUMENTS

| | | | |
|---|---|---|---|
| 6,526,034 B1 | 2/2003 | Gorsuch | |
| 6,826,154 B2 * | 11/2004 | Subbiah et al. | 370/236 |
| 7,512,120 B2 * | 3/2009 | Takahashi et al. | 370/354 |
| 7,561,553 B2 * | 7/2009 | Venkitaraman et al. | 370/338 |
| 2003/0236827 A1 * | 12/2003 | Patel et al. | 709/203 |
| 2004/0137903 A1 | 7/2004 | Park | |
| 2005/0083885 A1 * | 4/2005 | Ikeda et al. | 370/331 |

FOREIGN PATENT DOCUMENTS

| | | |
|---|---|---|
| KR | 2004-49125 | 6/2004 |
| KR | 2004-53858 | 6/2004 |
| KR | 2004-59570 | 7/2004 |
| KR | 2004-80994 | 9/2004 |
| WO | WO 01/22662 | 3/2001 |

OTHER PUBLICATIONS

Park M., "Link characteristics information for Mobile IP", IETF standard draft, Ch. No. 2, Jun. 2005.*

(Continued)

*Primary Examiner* — Christopher M Brandt
*Assistant Examiner* — Muthuswamy Manoharan
(74) *Attorney, Agent, or Firm* — Staas & Halsey LLP (57) ABSTRACT

A method and an apparatus to handover a mobile node between heterogeneous networks using a mobile internet protocol (IP) is provided. The method includes: connecting a mobile node to a movement destination network; obtaining information regarding, or about, the movement destination network; generating a message including the information regarding the movement destination network; and transmitting the generated message to a correspondent node that transmits continuous data to the mobile node.

36 Claims, 10 Drawing Sheets

(56) References Cited

OTHER PUBLICATIONS

Park M.,"Link Characteristics Information for Mobile IP", IETG standard draft, Apr. 2005.*

PCT Written Opinion of the International Searching Authority and Search Report issued on Aug. 25, 2006 re: International Application No. PCT/KR2006/001945 (9 pp).

Shiann-Tsong Sheu et al., "Smart Handoff Scheme for Supporting Roaming Between WLAN and GPRS Networks," IEEE 59th Vehicular Technology Conference, May 17-19, 2004; vol. 5; pp. 3004-3008.

Matthias Siebert et al., "Hybrid information System [3G/WLAN Intersystem Cooperation]," IEEE 59th Vehicular Technology Conference, May 17-19, 2004, vol. 5; pp. 2982-2986.

Pablo Vidales et al., "Autonomic System for Mobility Support in 4G Networks," *IEEE Journal on Selected Areas in Communications*, vol. 23, Issue 12, Dec. 2005, pp. 2288-2304.

European Search Report for European Application No. 06768596.6, mailed Dec. 12, 2012.

S. Daniel Park et al. "Link Characteristics Information for Mobile IP", Apr. 2005, XP015041642, pp. 1-12.

J. Korhonen et al., "Link Characteristics Information for IP Mobility Problem Statement", Sep. 2005, XP015042819, pp. 1-14.

\* cited by examiner

FIG. 1 (PRIOR ART)

7.6 MBPS PACKET LOSS

METHOD AND APPARATUS FOR HANDOVER BETWEEN HETEROGENEOUS NETWORKS USING MOBILE IP

CROSS-REFERENCE TO RELATED APPLICATIONS

This application claims priority from Korean Patent Application No. 2005-58306 filed on Jun. 30, 2005 in the Korean Intellectual Property Office, and U.S. Provisional Patent Application No. 60/684,190 filed on May 25, 2005 in the United States Patent and Trademark Office, the disclosures of which are incorporated herein by reference in their entirety.

BACKGROUND OF THE INVENTION

1. Field of the Invention

Aspects of the invention relate to a method and an apparatus to handover a mobile node between heterogeneous networks, and, more particularly, to a method and an apparatus to handover a mobile node between heterogeneous networks, in which information regarding a network of a mobile node is provided to a correspondent node to allow the correspondent node to transmit data in a form that is suitable to the network capacity of the mobile node.

2. Description of the Related Art

With the widespread use of mobile terminals, such as notebook computers and personal digital assistants (PDAs), increased attention has been focused on developing ways of using the Internet at various locations. In particular, research has been directed to providing seamless communication without disruption of service while moving from one to another subnet. In this regard, a mobile internet protocol (IP) technique is a representative example of techniques indicating IP mobility.

Mobile terminals having mounted therein various interfaces, such as a wireless local area network (LAN) interface, a code division multiple access (CDMA) interface, and an Ethernet interface are on the market, and it is expected that mobile terminals having mounted therein wireless broadband (WiBro) and other wired/wireless interfaces will likely emerge in the future. Also, in the same wireless LAN (WLAN), there are typically various standards in use, such as the (Institute of Electrical and Electronics Engineers (IEEE)) IEEE802.11b standard supporting the data rate of 11 Mbps and the IEEE802.11a and IEEE802.11g standards supporting the data rate of 54 Mbps. Further, a method of using a mobile IP has been developed to allow free movement between wireless networks.

Figure 1:
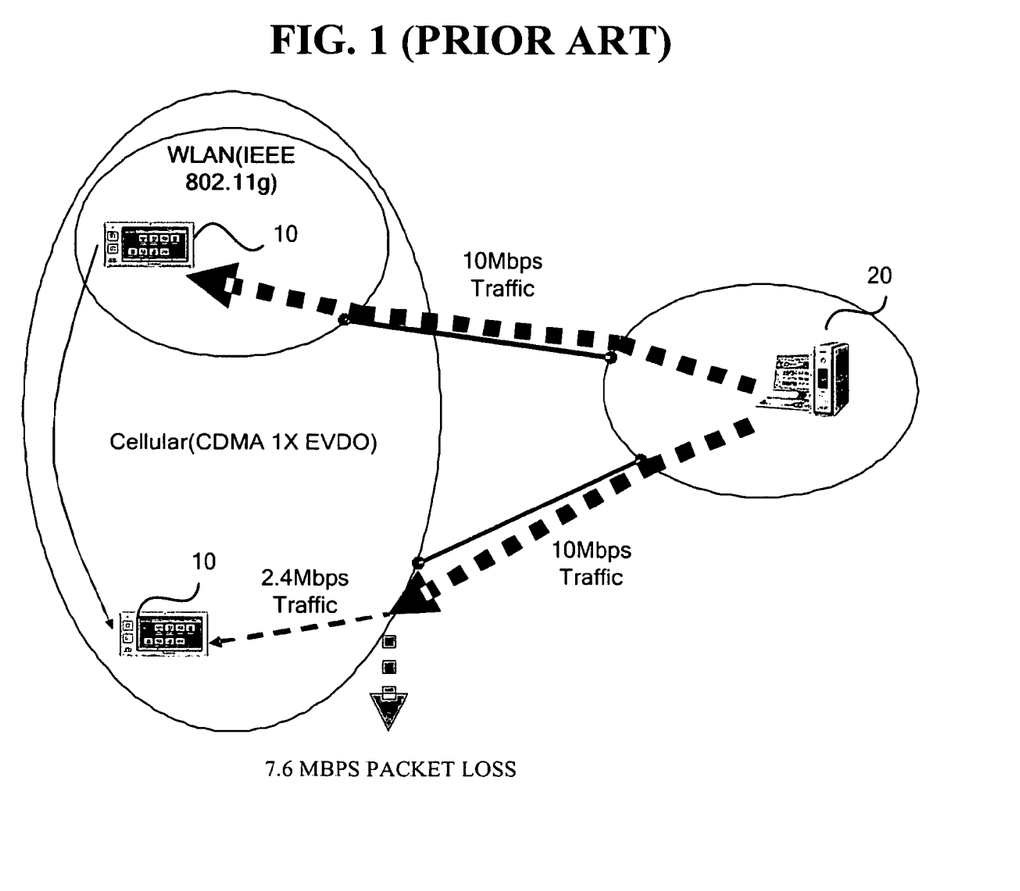
FIG. 1 illustrates a handover process between heterogeneous networks according to a conventional mobile IP technique.

FIG. 1 illustrates a handover process between heterogeneous networks according to a conventional mobile IP technique. Referring to FIG. 1, there is a network including a transmitter (correspondent node) 20 transmitting continuous data to a mobile node 10 and a wireless LAN (IEEE 802.11g) network including the mobile node 10. A CDMA network covers an area including the wireless LAN network.

When a mobile node user is moving while receiving traffic data at 10 Mbps from the correspondent node 20, the mobile node user can move out of service range of IEEE 802.11g.wireless LAN. At this time, the mobile node user can continue to receive service in another way and can use CDMA, which has a wider service range, but is expensive and has a low transfer rate. Session interruption during movement of the mobile node user can be prevented using a mobile IP, and a method of preventing such session interruption is under development.

Referring to FIG. 1, the mobile node 10 requests data from the correspondent node 20 and continuously receives data from the correspondent node 20 at a rate of 10 Mbps through an IEEE 802.11 network. Where the mobile node 10 moves in a downward direction while continuously receiving data and moves out of a service range of the IEEE 802.11g wireless LAN, a CDMA network can take over a communication session using a mobile IP for seamless service. Upon completion of a handover, the data transmitted from the correspondent node 20 is transferred to the mobile node 10 through the CDMA network.

However, in FIG. 1, the amount of data transmitted from the correspondent node 20 is typically larger than the amount of data that can be serviced by the CDMA network. In this regard, since a maximum data rate supported by the CDMA network is 2.4 Mbps, the amount of data actually transmitted is only 2.4 Mbps out of the data transmitted from the correspondent node 20, such as 10 Mbps, suggesting occurrence of a possible data loss of 7.6 Mbps. In other words, although a session is taken over using a mobile IP, a normal communication service typically cannot be provided.

The Internet tends to transmit as much data as possible by fully using an available network (best effort service). Such a tendency to transmit as much data as possible is typically true in a multimedia service to provide superior audio quality and display quality. However, due to increasing numbers of heterogeneous wireless networks having different capacities, it can be difficult to provide a smooth service due to differences between infrastructures of applications tending to transmit as much data as possible and wireless networks limiting their available bandwidths differently.

For example, a method of handover between heterogeneous networks using a mobile IP is disclosed in Korean Patent Publication No. 2004-49125. In this regard, Korean Patent Publication No. 2004-49125 discloses an apparatus and method for handover between different mobile communication systems.

SUMMARY OF THE INVENTION

Several aspects and example embodiments of the invention provide a method and an apparatus to handover a mobile node between heterogeneous networks, wherein data can be transmitted and received in a form that is suitable for available bandwidths of heterogeneous wireless networks having different transfer rates, when a mobile node moves between the heterogeneous wireless networks.

According to an aspect, among aspects, of the invention, there is provided a method to handover a mobile node between heterogeneous networks using a mobile internet protocol (IP). The method includes: connecting a mobile node to a movement destination network; obtaining information regarding, or about, the movement destination network; generating a message including the information regarding the movement destination network; and transferring the generated message to a correspondent node that transmits continuous data to the mobile node.

According to another aspect, among aspects, of the invention, there is provided a method to handover a mobile node between heterogeneous networks using a mobile internet protocol (IP), the method including: extracting information by a mobile node regarding a movement destination network from a reference message transmitted by the movement destination network; generating a communication control message including information regarding the movement destination network; and transmitting the communication control message to a correspondent node that transmits continuous data to the mobile node.

According to a further aspect, among aspects, of the invention, there is provided a method to handover a mobile node between heterogeneous networks using a mobile internet protocol (IP), the method including: receiving a message including information regarding a movement destination network to which a mobile node is currently connected; extracting the information regarding the movement destination network from the message; and transmitting data having a bandwidth adjusted according to the information on or about, the movement destination network to the mobile node.

According to further aspects, among aspects, of the invention, there are provided computer-readable recording media having embodied thereon a computer program to execute by a processor the aforementioned methods to handover a mobile node between heterogeneous networks using a mobile internet protocol (IP).

According to another aspect, among aspects, of the invention, there is provided an apparatus to handover a mobile node between heterogeneous networks using a mobile internet protocol (IP), the apparatus including: a unit to extract information regarding a movement destination network from a reference message transmitted by the movement destination network; a unit to generate a communication control message including information regarding the movement destination network; and a unit to transmit the communication control message to a correspondent node that transmits continuous data to the mobile node.

According to a further aspect, among aspects, of the invention, there is provided an apparatus to handover a mobile node between heterogeneous networks using a mobile internet protocol (IP), the apparatus including: a unit to receive a message including information regarding a movement destination network to which the mobile node is currently connected; a unit to extract the information about the movement destination network from the message; and a unit to transmit data having a bandwidth adjusted according to the information regarding the movement destination network to the mobile node.

According to another aspect, among aspects, of the invention, there is provided an apparatus to handover a mobile node between heterogeneous networks using a mobile internet protocol (IP), the apparatus including: a unit to connect the mobile node to a movement destination network; a unit to obtain information on the movement destination network; a unit to generate a message including the information on the movement destination network; and a unit to transmit the message to a correspondent node that transmits continuous data to the mobile node.

Additional aspects and/or advantages of the invention are set forth in the description which follows or are evident from the description, or can be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to embodiments of the invention, examples of which are illustrated in the accompanying drawings, wherein like reference numerals refer to the like elements throughout. The embodiments are described below in order to explain aspects of the invention by referring to the figures, with well-known functions or constructions not necessarily being described in detail.

To facilitate understanding of the invention, it is assumed that a movement source network (also called a home network) of a mobile node is an IEEE 802.11g wireless LAN and a movement destination network (also called an external network) of the mobile node is a CDMA network. However, the invention is not limited in this regard.

Also, to facilitate an understanding of the aspects of the invention, it is assumed that a mobile node moves between two heterogeneous networks, such as an IEEE 802.11g wireless LAN network supporting 54 Mbps and a wireless Internet network (hereinafter, a CDMA network) using a CDMA 1×EV-DO service supporting 2.4 Mbps, for example, although the invention is not limited in this regard. In addition, various heterogeneous networks, such as IEEE 802.11a, IEEE 802.11b, IEEE 802.16e, IEEE 802.20, high speed downlink packet access (HSDPA), wideband code division multiple access (W-CDMA), and Bluetooth, can be applied to aspects of the invention.

Figure 2:
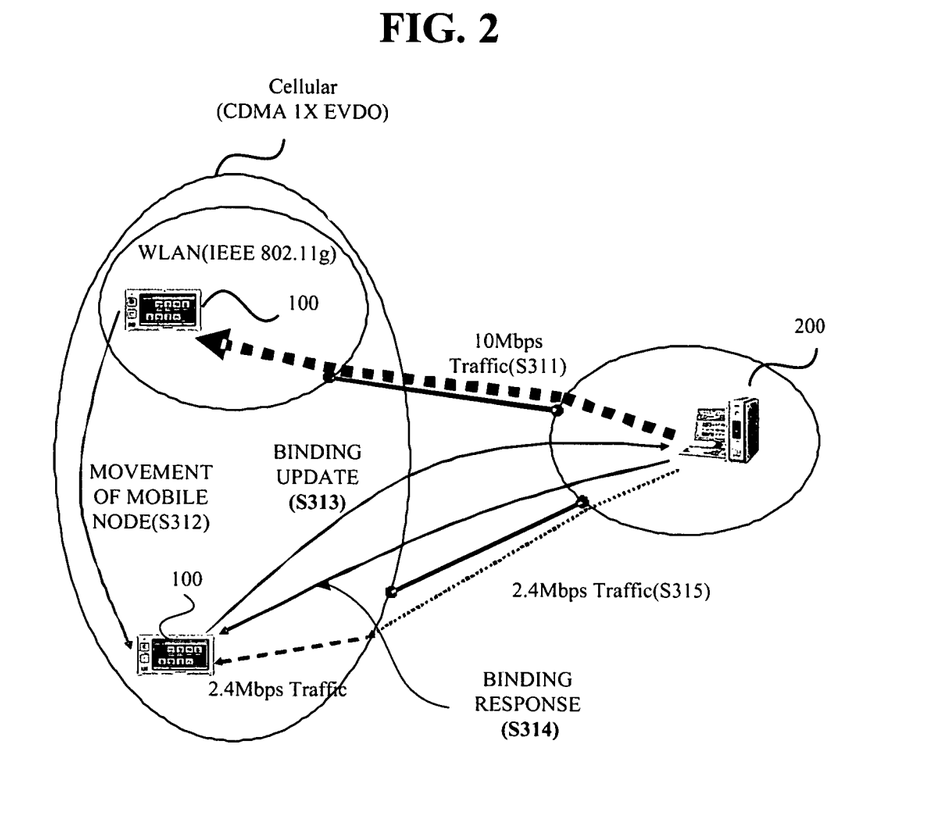
FIG. 2 illustrates a handover process between heterogeneous networks according to an embodiment of the invention.

FIG. 2 illustrates a handover process between heterogeneous networks according to an embodiment of the invention. Referring to FIG. 2, a mobile node 100 connected to an IEEE 802.11g wireless LAN requests data from a correspondent node 200 and receives the data at a rate of 10 Mbps in operation S311. In operation S312, the mobile node 100 moves while continuously receiving the data at a rate of 10 Mbps. Once the mobile node 100 moves out of a service range of the IEEE 802.11g wireless LAN, a handover is performed through a wireless link connection from the IEEE 802.11g wireless LAN to the CDMA network according to a handover rule prescribed in mobile IPv4 RFC 3344 or mobile IPv6 RFC 3775.

When a handover is performed using mobile IPv6, the mobile node 100 provides link information of its currently connected network to the correspondent node 200 through a binding update process. In other words, the mobile node 100 inserts the collected link information (the type and available bandwidth of the network) into an option portion of a binding update message and transmits the binding update message to the correspondent node 200 in operation S313.

The correspondent node 200 receives the binding update message and extracts current link information of the mobile node 100. The correspondent node 200 recognizes that the mobile node 100 is currently connected to the CDMA network supporting 2.4 Mbps and transmits a binding response message to the mobile node 100 in operation S314. Once a connection between the mobile node 100 and the correspondent node 200 is established through the binding update process, the correspondent node 200 transmits data at a transfer rate supported by the current CDMA network, such as 2.4 Mbps, to the mobile node 100 in operation S315.

Although the bandwidth of a movement destination network is smaller than that of a movement source network in the example embodiment of FIG. 2 of the invention, the invention can also be applied to a case where the bandwidth of the movement source network is smaller than that of the movement destination network.

Figure 3:
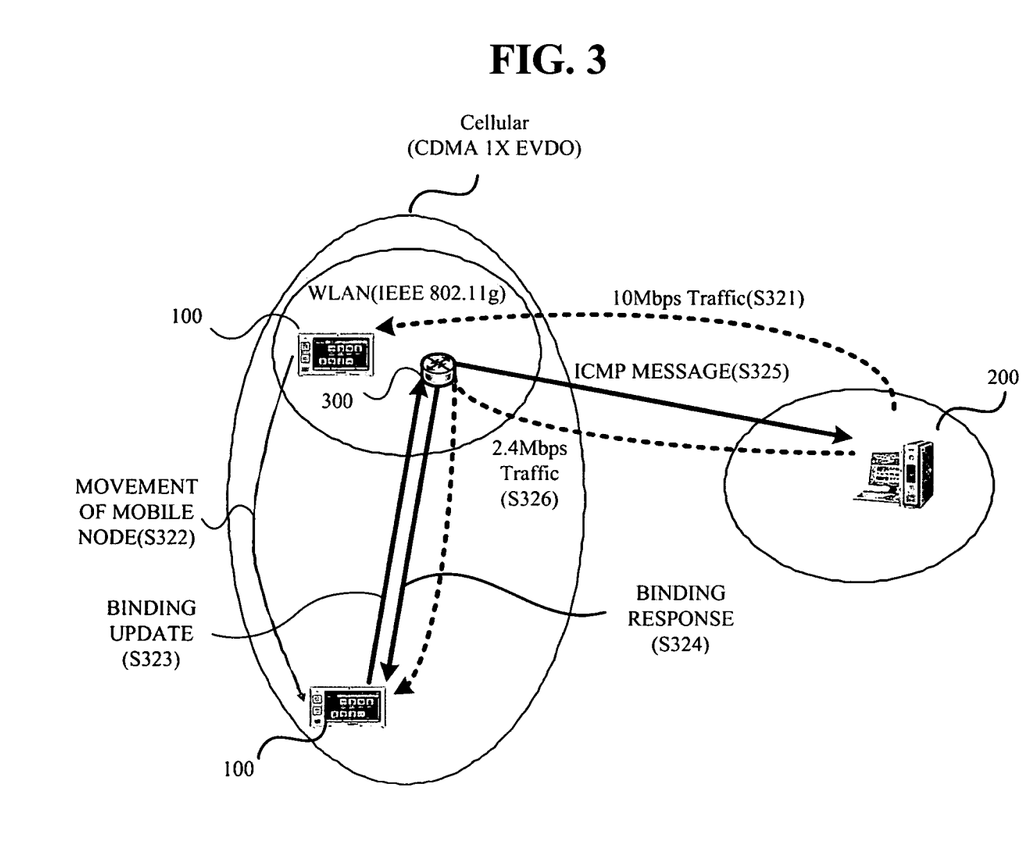
FIG. 3 illustrates a handover process between heterogeneous networks according to another embodiment of the invention.

FIG. 3 illustrates a handover process between heterogeneous networks according to another example embodiment of the invention. Referring to FIG. 3, in the case of mobile IPv4, formation of a direct path to a correspondent node 200 is not supported, but data can be received through a router (also called a home agent) of a movement source network of a mobile node 100. In the embodiment of FIG. 3 of the invention, link information of the mobile node 100 is provided to the correspondent node 200 through a home agent 300.

The mobile node 100 connected to an IEEE 802.11g wireless LAN requests data from the correspondent node 200 and receives the data at a rate of 10 Mbps in operation S321. In operation S322, the mobile node 100 moves while continuously receiving the data at a rate of 10 Mbps. The mobile node 100 collects link information of a current CDMA network, inserts the collected link information into an option portion of a binding update message, and transmits the binding update message to the home agent 300 in operation S323. The home agent 300 extracts information of a current network of the mobile node 100 from the binding update message and transmits a binding response message to the mobile node 100 in operation S324. The home agent 300 generates an Internet control message protocol (ICMP) message including the link information received from the mobile node 100 and transmits the ICMP message to the correspondent node 200 in operation S325. The correspondent node 200 obtains link information of the mobile node 100 from the received ICMP message and transmits data that is adjusted to suit an available bandwidth of the CDMA network to the mobile node 100 through the home agent 300 in operation S326.

Figure 4:
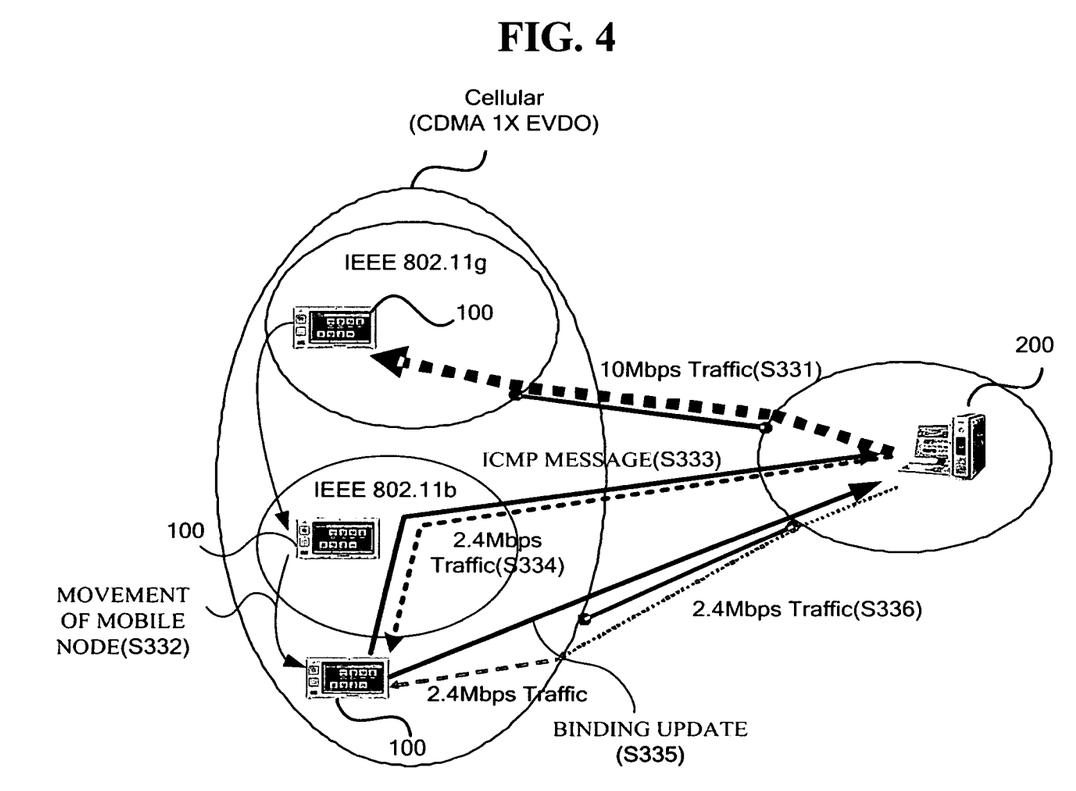
FIG. 4 illustrates a handover process between heterogeneous networks according to a further embodiment of the invention.

A handover process between heterogeneous networks according to a further example embodiment of the invention is described with reference to FIG. 4. In FIG. 4, link information of a current network of a mobile node is provided to a correspondent node using a new ICMP message instead of a binding update message.

Referring to FIG. 4, a mobile node 100 connected to an IEEE 802.11g wireless LAN requests data from a correspondent node 200 and receives the data at a rate of 10 Mbps in operation S331. In operation S332, the mobile node 100 moves while continuously receiving the data at a rate of 10 Mbps. If the mobile node 100 moves from a service area of the IEEE 802.11g wireless LAN to a service area of an IEEE 802.11b wireless LAN and then moves out of the service area of the IEEE 802.11b wireless LAN, a handover is performed through a wireless link connection from the IEEE 802.11g wireless LAN to the IEEE 802.11b wireless LAN and from the IEEE 802.11b wireless LAN to the CDMA network according to a handover rule prescribed in mobile IPv4 RFC 3344 or mobile IPv6 RFC 3775, for example.

When the mobile node 100 moves out of the service area of the IEEE 802.11b wireless LAN, an L2 trigger is generated in a layer. Upon generation of the L2 trigger, the mobile node 100 can obtain information about a movement destination network through a reference message, such as a beacon message. The reference message indicates a message including information about a network required for communication. Thus, the mobile node 100 can provide information about a network to which the mobile node 100 has moved to the correspondent node 200 through a previous network (such as the IEEE 802.11b wireless LAN) even before being assigned a new IP address. In this regard, the mobile node 100 inserts network information into a new communication control message and transmits the communication control message in operation S333. The communication control message indicates a message including information required for control of a communication medium. For example, the communication control message can be an ICMP message. In the embodiment of FIG. 4 of the invention using a mobile IP, the ICMP message is used as the communication control message, for example. In addition, the ICMP message may be used together with other protocols as well as independently as the communication control message.

Since the correspondent node 200 receiving the ICMP message can extract information regarding a network to which the mobile node 100 is connected even before performing a binding update with the mobile node 100, it can transmit data that is adjusted to suit an available bandwidth of the CDMA network to the mobile node 100 through the IEEE 802.11b wireless LAN in operation S334. Thereafter, once the mobile node 100, which has been assigned a new IP address from a router of the CDMA network, transmits a binding update message to the correspondent node 200 in operation S335, the correspondent node 200 can directly transmit data having a transfer rate of 2.4 Mbps to the mobile node 100, for example.

Since an ICMP message is additionally defined in the example embodiment of FIG. 4 of the invention, compatibility with conventional mobile IPv6 can be degraded relative to the example embodiment of FIG. 2 of the present invention. However, the example embodiment of FIG. 4 of the invention can be advantageous over the example embodiment of FIG. 2 of the invention in that information regarding a change in the wireless link can be provided to a correspondent node in an L2 trigger stage before an IP address is changed in a layer. In this regard, since the example embodiment of FIG. 4 of the invention using a new ICMP message responds to a change of the wireless link more rapidly than the example embodiment of FIG. 2 of the invention using a binding update process, a mobile device and a service provider can rapidly adapt to a changing environment.

Figure 5:
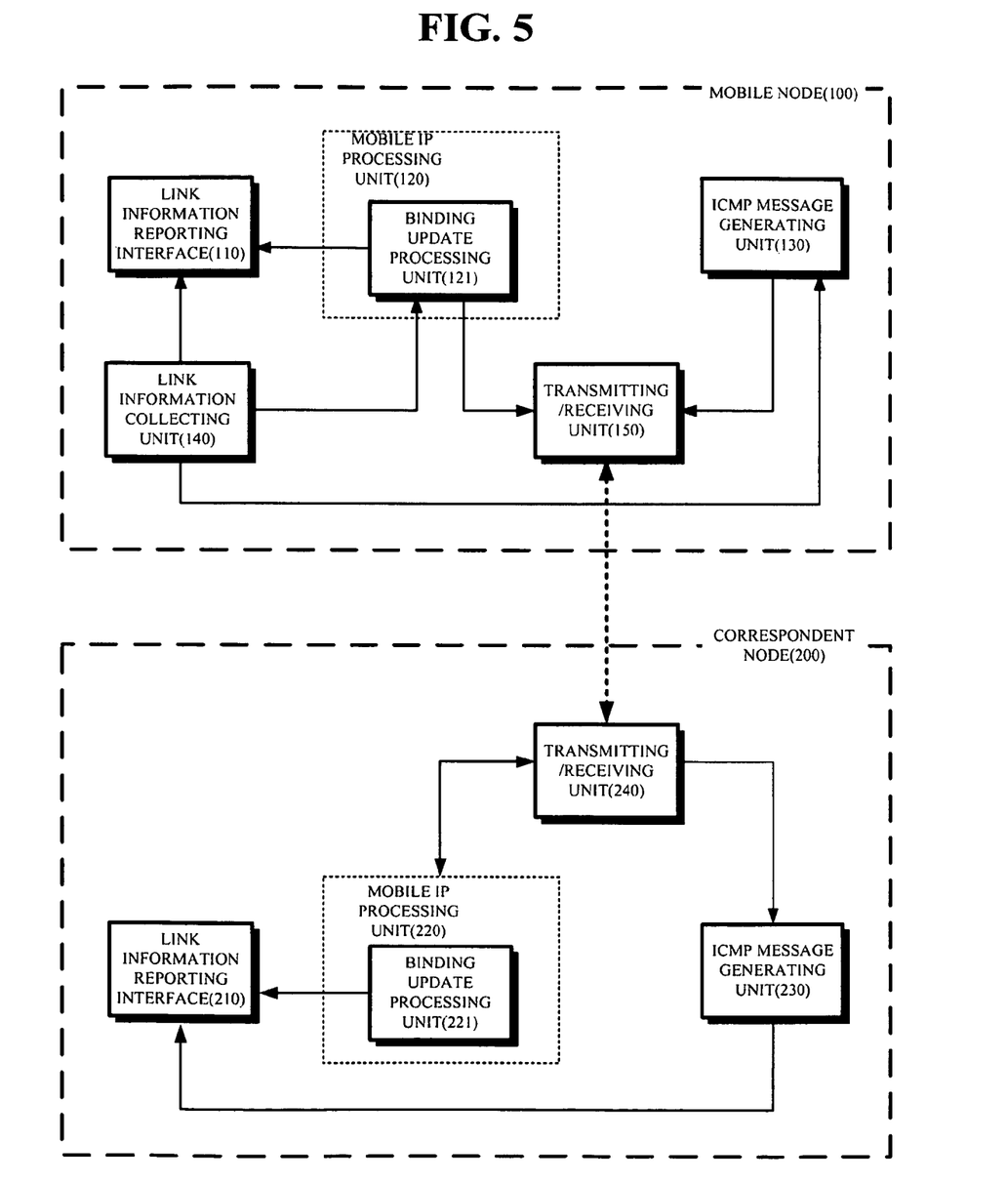
FIG. 5 illustrates a mobile node and a correspondent node according to an embodiment of the invention.

FIG. 5 illustrates an example of the mobile node 100 and the correspondent node 200 according to an embodiment and aspects of the invention. Referring to FIG. 5, the mobile node 100, according to an embodiment of the invention, includes a link information reporting interface 110, a mobile IP processing unit 120, an ICMP message generating unit 130, a link information collecting unit 140, and a transmitting/receiving unit 150. The link information collecting unit 140 collects link information regarding a network to which the mobile node 100 is connected, such as the type and available bandwidth of the network from at least one of a physical layer, a media access control (MAC) layer, and a logical link control (LLC) layer and provides the collected link information to the link information reporting interface 110, the mobile IP processing unit 120, or the ICMP message generating unit 130.

The mobile IP processing unit 120 can be divided into a unit for performing a conventional mobile IP function and a binding update processing unit 121. The binding update processing unit 121 generates a binding update message including the link information of the mobile node 100 provided from the link information collecting unit 140 and transmits the generated binding update message to the transmitting/receiving unit 150. The binding update processing unit 121 also transmits the link information to the link information reporting interface 110.

When the mobile node 100 provides the link information of the mobile node 100 to the correspondent node 200 using a separate ICMP message, instead of the binding update message, the ICMP message generating unit 130 generates a new ICMP message including the link information provided from the link information collecting unit 140 and transmits the generated ICMP message through the transmitting/receiving unit 150. The link information reporting interface 110 indicates an interface that reports link information obtained from a local node or a remote node to an upper application.

The correspondent node 200, in the example embodiment of FIG. 5, includes a link information reporting interface 210, a mobile IP processing unit 220, an ICMP message processing unit 230, and a transmitting/receiving unit 240. The mobile IP processing unit 220 can be divided into a unit for performing a conventional mobile IP function and a binding update processing unit 221. The binding update processing unit 221 processes a binding update message received through the transmitting/receiving unit 240. When the mobile node 100 inserts link information into the binding update message and transmits the binding update message, the binding update processing unit 221 extracts the link information from the binding update message and transmits the extracted link information to the link information reporting interface 210.

When the mobile node 100 transmits its link information using an ICMP message, the ICMP message processing unit 230 extracts the link information by processing the ICMP message received through the transmitting/receiving unit 240 and transmits the extracted link information to the link information reporting interface 210. The link information reporting interface 210 transmits the link information provided from the binding update processing unit 221 and the ICMP message processing unit 230 to an upper application to enable an application of the correspondent node 200 to transmit data that is adjusted to suit network characteristics to the mobile node 100 based on the transmitted link information.

In FIG. 5, various components of and the mobile node 100 and the correspondent node 200 can be implemented by hardware components, such as a processor, Field Programmable Gate Arrays (FPGAs) or Application Specific Integrated Circuits (ASICs), which, with the requisite programming and software, and associated memory, perform the tasks and functions of the mobile node 100 and the correspondent node 200, as described, although the invention is not limited in this regard.

Also, the components of and the mobile node 100 and the correspondent node 200 can be configured to reside on the addressable storage media and/or configured to execute on one or more processors, for example. Further, the functionality provided for in the components and modules of and the mobile node 100 and the correspondent node 200 can be combined into fewer components and modules or further separated into additional components and modules, and in addition, the components and modules can be implemented to execute by one or more computers in a communication system, according to aspects of the invention.

Figure 6:
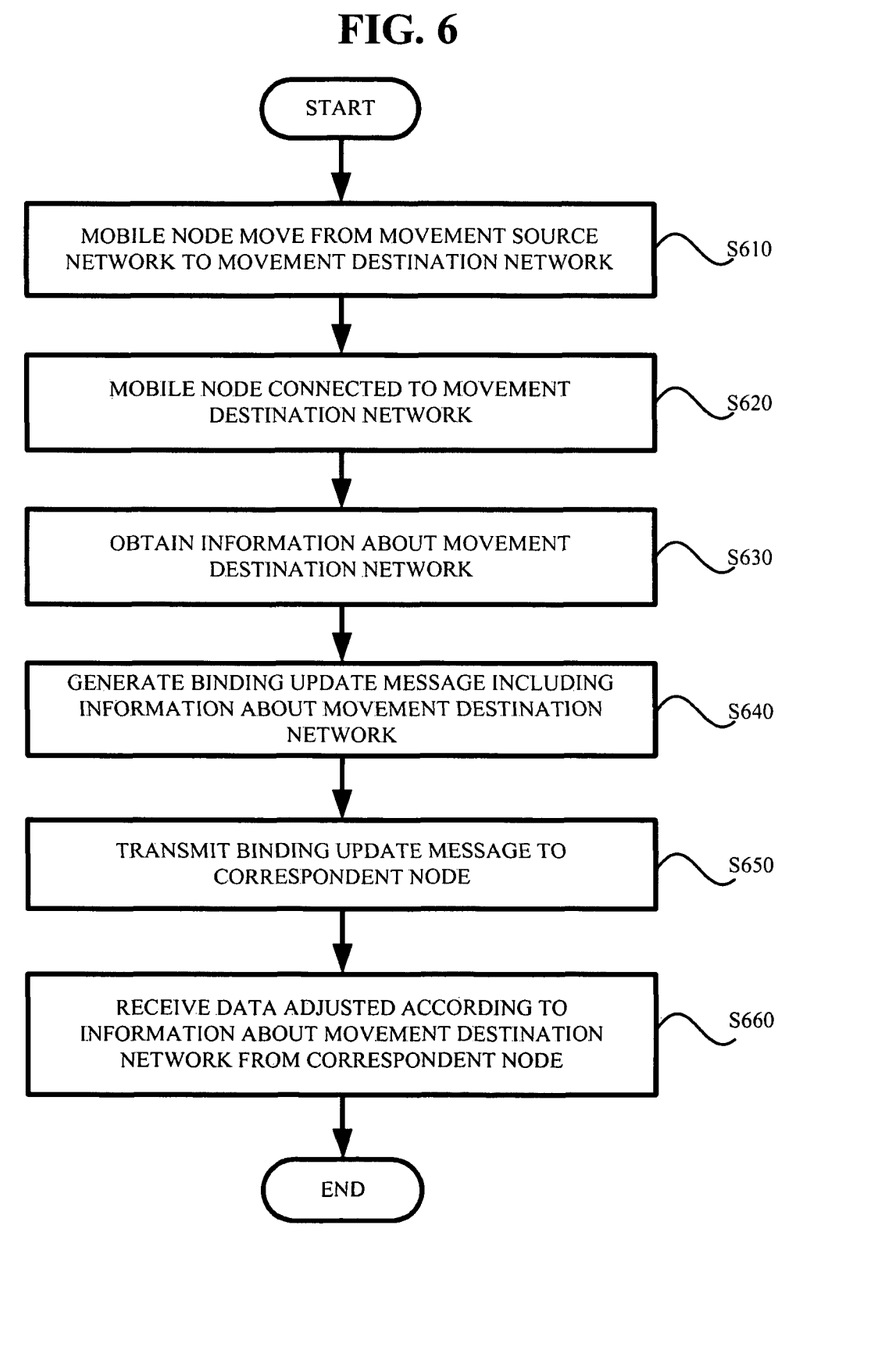
FIG. 6 is a flowchart illustrating a handover process between heterogeneous networks at a mobile node according to an embodiment of the invention.

FIG. 6 is a flowchart illustrating a handover process between heterogeneous networks at a mobile node according to an example embodiment of the invention. Referring to FIGS. 5 and 6, when the mobile node 100 moves from a movement source network (home network) to a movement destination network (external network) in operation S610, the mobile node 100 is connected to the movement destination network by discovering a foreign agent that is a router of the movement destination network and obtaining an address of the movement destination network from the foreign agent in operation S620. The link information collecting unit 140 obtains information about the movement destination network from a physical layer, a MAC layer, or an LCC layer in operation S630.

The binding update processing unit 121 generates a binding update message including an address of the movement destination network of the mobile node 100 and information about the movement destination network in operation S640 and transmits the binding update message to the correspondent node 200 in operation S650. A further operation, wherein a response message is received from the correspondent node 200, in response to the binding update message, can be added in operation S650. The mobile node 100 receives data adjusted according to link information of the movement destination network from the correspondent node 200 in operation S660.

Figure 7:
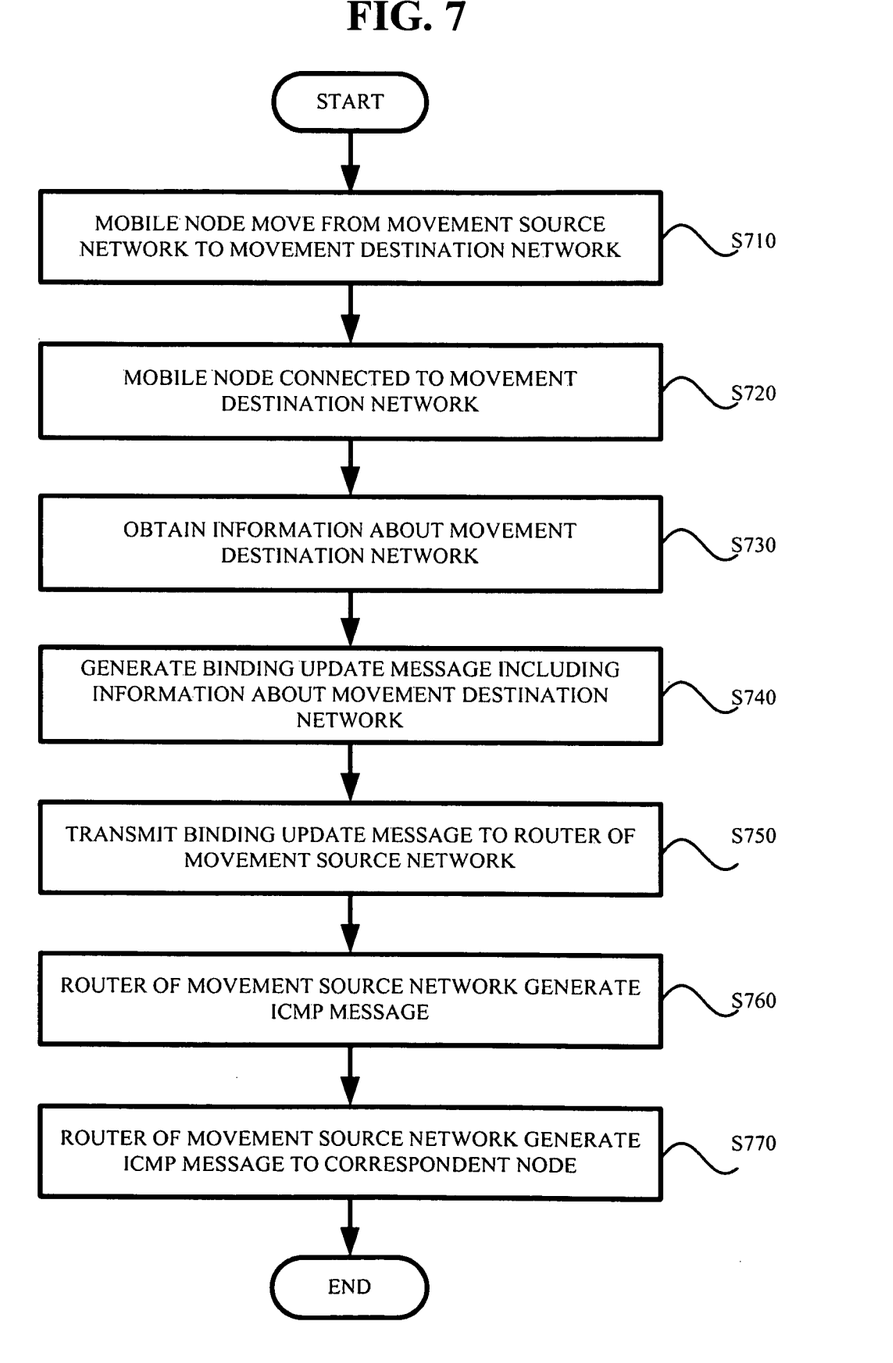
FIG. 7 is a flowchart illustrating a handover process between heterogeneous networks at a mobile node according to another embodiment of the invention.

FIG. 7 is a flowchart illustrating a handover process between heterogeneous networks at a mobile node according to another example embodiment of the invention. Referring to FIGS. 5 and 7, when the mobile node 100 moves from the movement source network to the movement destination network in operation S710, the mobile node 100 is connected to the movement destination network by discovering the foreign agent that is the router of the movement destination network and obtaining a network address from the foreign agent in operation S720. The link information collecting unit 140 obtains link information regarding the movement destination network of the mobile node 100 from a physical layer, a MAC layer, or an LLC layer in operation S730.

The binding update processing unit 121 generates a binding update message including an address of the movement destination network of the mobile node 100 and the link information of the mobile node 100 in operation S740 and transmits the binding update message to the home agent, or router, in operation S750. The home agent, or router, extracts the link information from the binding update message and generates a separate ICMP message including the link information to provide the link information to the correspondent node 200 in operation S760. The home agent, or router, transmits the generated ICMP message to the correspondent node 200 in operation S770. The example embodiment of FIG. 7 of the invention can be applied to a mobile IP technique that does not support a direct connection between a mobile node and a correspondent node, such as mobile IPv4, for example.

Figure 8:
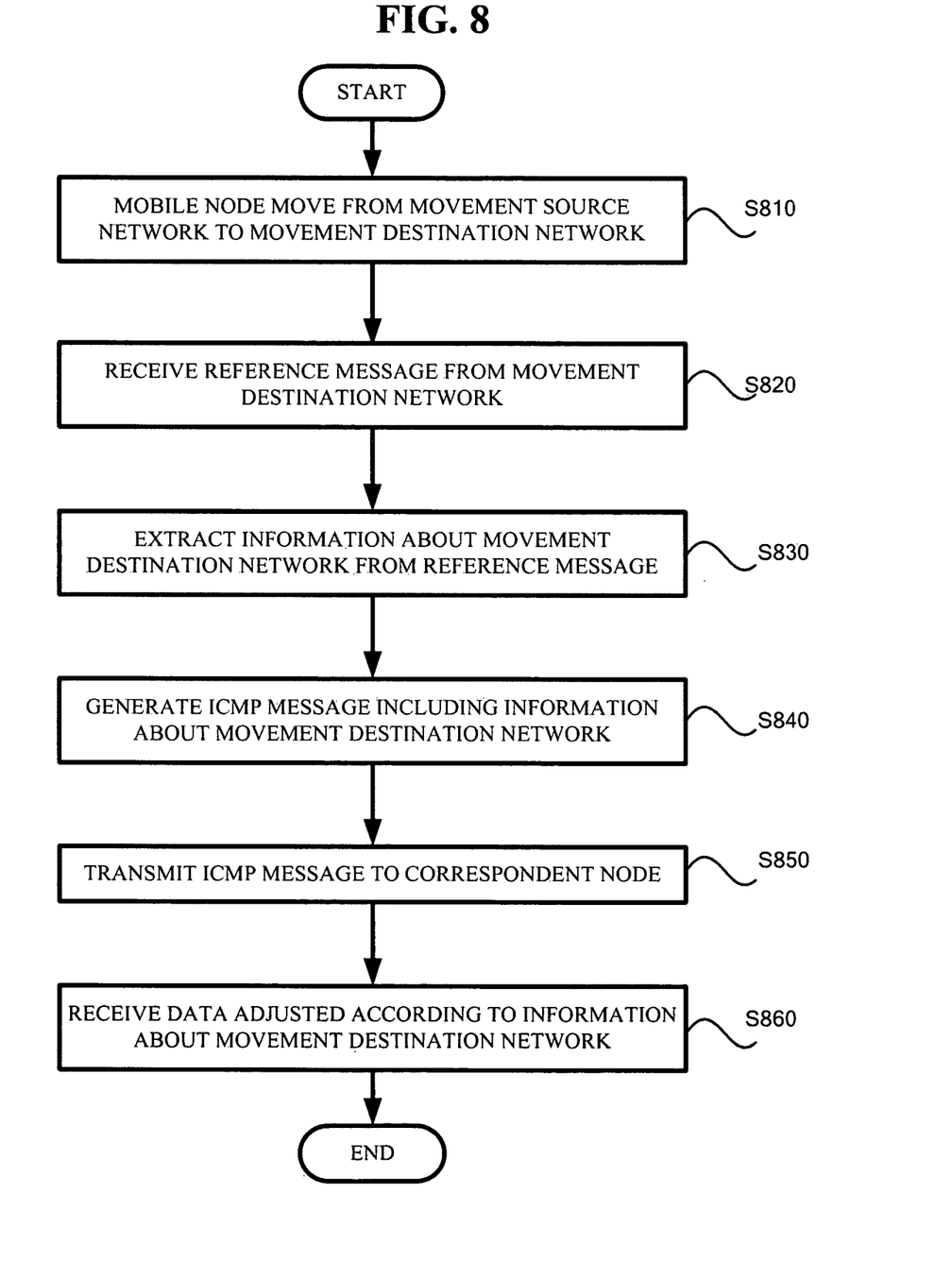
FIG. 8 is a flowchart illustrating a handover process between heterogeneous networks at a mobile node according to a further embodiment of the invention.

FIG. 8 is a flowchart illustrating a handover process between heterogeneous networks at a mobile node according to a further example embodiment of the invention. Referring to FIGS. 5 and 8, when the mobile node 100 moves from the movement source network to the movement destination network in operation S810, an L2 trigger is generated in layer that is a link layer. The mobile node 100 receives a reference message, such as a beacon, broadcasted by the movement destination network in operation S820, and link information, such as the type and available bandwidth of the movement destination network, can be obtained from the reference message in operation S830. The ICMP message generating unit 130 of the mobile node 100 generates an ICMP message including link information in operation S840. The ICMP message generating unit 130 transmits the generated ICMP message to the correspondent node 200 through the transmitting/receiving unit 150 in operation S850. Data adjusted according to the link information transmitted from the correspondent node 200 is received in operation S860.

Figure 9:
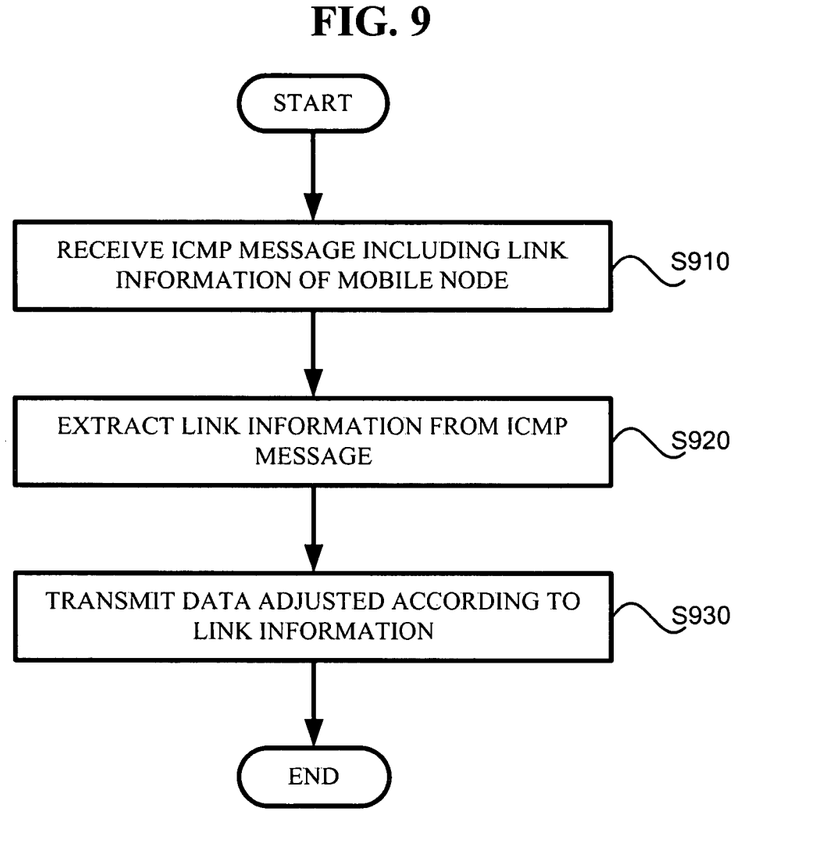
FIG. 9 is a flowchart illustrating a handover process between heterogeneous networks at a correspondent node according to an embodiment of the invention.

FIG. 9 is a flowchart illustrating a handover process between heterogeneous networks at a correspondent node according to an example embodiment of the invention. Referring to FIGS. 5 and 9, when the correspondent node 200 receives an ICMP message including link information of the mobile node 100 in operation S910, the correspondent node 200 extracts the link information of the mobile node 100 from the received ICMP message in operation S920. The ICMP message can be a binding update message or a separate ICMP message generated by the mobile node 100 or a home agent. The correspondent node 200 transmits data whose amount is adjusted according to the extracted link information to the mobile node 100 in operation S930.

Figure 10:
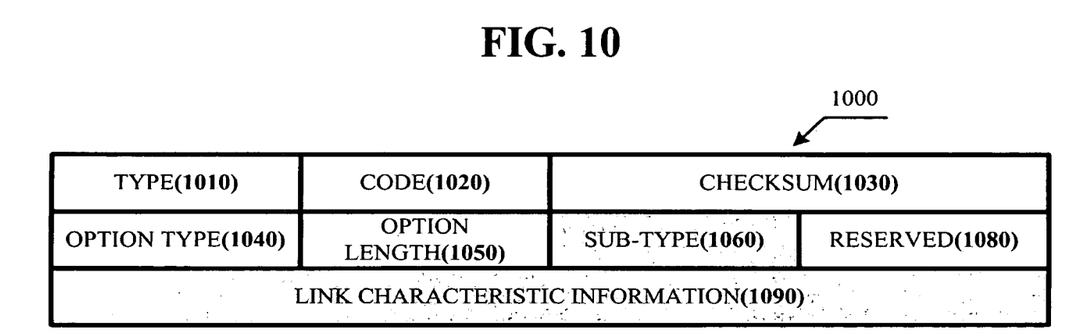
FIG. 10 illustrates a binding update message including link information of a mobile node according to an embodiment of the invention.

FIG. 10 illustrates a binding update message 1000 including link information of the mobile node 100 according to an example embodiment of the invention. Referring to FIG. 10, the binding update message 1000 indicates a type of ICMP message used by the mobile node 100 to inform the correspondent node 200 or the home agent of binding position information of the movement source network and position information of the movement destination network. The binding update message 1000 can be used to register an address of the movement destination network of the mobile node 100 in the correspondent node 200 or the home agent. The mobile node 100, according to aspects of the invention, can add an option indicating link characteristic information to a conventional binding update message and transmit the binding update message to the correspondent node 200 or the home agent, to inform the correspondent node 200 of information regarding a network to which the mobile node 100 is currently connected.

Referring to FIG. 10, an example binding update message 1000 that can be used by the mobile node 100, according to an embodiment and aspects of the invention, includes a type field 1010 indicating a specific ICMP message, a code field 1020 having different values corresponding to specific states, a checksum field 1030, an option type field 1040, an option length field 1050, a sub-type field 1060 indicating the type of network to which the mobile node 100 is currently connected, a link characteristic information field 1090 indicating detailed information about a network according to the value of the sub-type field 1060, and a reserved field 1080. Also, the link characteristic information field 1090 can include detailed information about a link, such as information about the bandwidth and security of a network to which a mobile node is currently connected, according to the value of the sub-type field 1060.

An example of a network type value of the sub-type field 1060 of the update message 1000 of FIG. 10, and the sub-type field 1160 of the message 1100 of FIG. 11, according to aspects of the invention, is indicated in Table 1, as follows.

TABLE 1

| Sub-type | Link type |
|---|---|
| 0 | LAN (802.3) |
| 1 | WLAN (802.11b) |
| 2 | WLAN (802.11a) |
| 3 | WLAN (IEEE 802.11g) |
| 4 | WLAN (802.11n) |
| 5-15 | Reservation value for (W)LAN Extension |
| 16 | CDMA |
| 17 | General Packet Radio Service (GPRS) |
| 18 | Universal Mobile Telecommunications System (UMTS) |
| 19-31 | Reservation value for cellular network |
| 32-47 | 802.15 family network |
| 48-63 | 802.16 family network |
| 64 | Bluetooth |
| 65-255 | Reservation |

Figure 11:
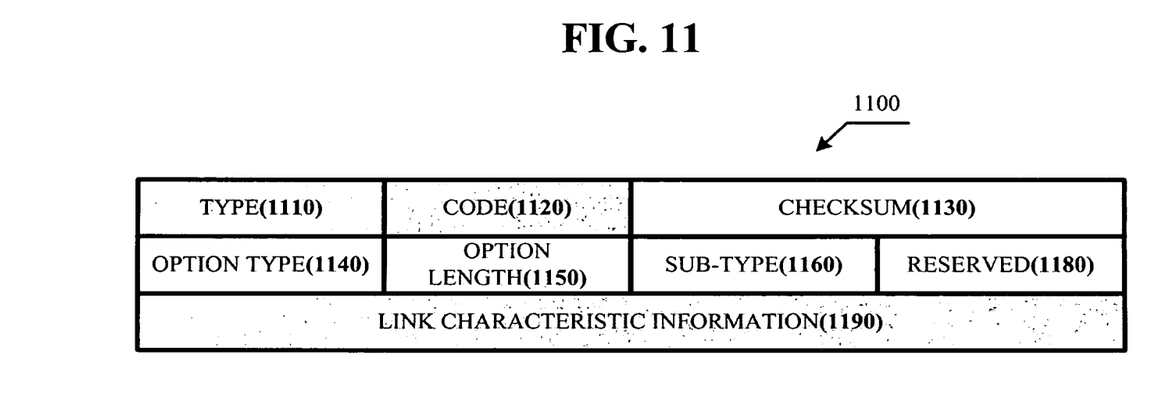
FIG. 11 illustrates an Internet control message protocol (ICMP) message including link information of a mobile node according to an embodiment of the invention.

FIG. 11 illustrates an Internet control message protocol (ICMP) message 1100 including link information of a mobile node according to an example embodiment and aspects of the invention. Referring to FIG. 11, the ICMP indicates a portion of an IP layer and generates an error message and information messages regarding state information requiring attention. Also an ICMP message is usually used by layer protocol of an IP layer or an upper layer of the layer protocol.

Referring to FIG. 11, the ICMP message 1100 used by a mobile node 100 or a home agent, or router, according to an example embodiment and aspects of the invention, includes a type field 1110 indicating a specific ICMP message, a code field 1120 having different values corresponding to specific states, a checksum field 1130, an option type field 1140, an option length field 1150, a sub-type field 1160 indicating the type of a network to which the mobile node 100 is currently connected, a link characteristic information field 1190 indicating detailed information about a network according to the value of the sub-type field 1160, and a reserved field 1180. Also, a link type value the sub-type field 1160 can have is indicated as in Table 1, as described. Further, the link characteristic information field 1190 can include detailed information about a link, such as information about the bandwidth and security of a network to which the mobile node is currently connected, according to the value of the sub-type field 1160.

The code field 1120 can be used to identify the ICMP message 1100. For example, when the ICMP message 1100 is transmitted from a mobile node 100 to a correspondent node 200, such as in the embodiment and aspects of the invention described with reference to FIG. 8, the code field 1120 can have a value of 1, for example. When the ICMP message 1100 is transmitted from a home agent, or router, to the correspondent node 200, such as in the embodiment and aspects of the invention described with reference to FIG. 7, the code field 1120 can have a value of 0, for example.

As described above, a method and an apparatus to handover between heterogeneous networks, according to aspects of the invention, can provide the following and other advantages. An advantage, among advantages, of the invention, is that information regarding a network to which a mobile node is currently connected can be provided to a correspondent node, to promote enabling data to be transmitted/received in a form that is suitable for, or corresponds to, available bandwidths of heterogeneous networks having different transfer rates, when the mobile node moves between the heterogeneous networks. Another advantage, among advantages, of the invention, is that when the mobile node moves between wireless networks providing different bandwidths, data loss can be prevented.

The foregoing embodiments, aspects and advantages are merely exemplary and are not to be construed as limiting the invention. Also, the description of the embodiments of the invention is intended to be illustrative, and not to limit the scope of the claims, and various other alternatives, modifications, and variations will be apparent to those skilled in the art. Therefore, although a few embodiments of the invention have been shown and described, it would be appreciated by those skilled in the art that changes may be made in the embodiments without departing from the principles and spirit of the invention, the scope of which is defined in the claims and their equivalents.

What is claimed is:

1. A method to handover a mobile node between heterogeneous networks using a mobile internet protocol (IP), the method comprising:
    connecting the mobile node to a movement destination network;
    obtaining information regarding the movement destination network;
    generating a message including the information regarding the movement destination network; and
    transmitting the information regarding the movement destination network without passing information through a router of a movement source network of the mobile node to a correspondent node when the message including the information regarding the movement destination network is received at the router of the movement source network of the mobile node, the corresponding node continuously transmitting an amount of continuous data to the mobile node based on the received information regarding the movement destination network.

2. The method of claim 1, wherein:
    the message transmitted to the correspondent node includes information that binds position information of a movement source network of the mobile node and position information of the movement destination network of the mobile node.

3. The method of claim 1, wherein the transmitting the message comprises:
    transmitting the message to the router of the movement source network of the mobile node,
    extracting the information regarding the movement destination network from the message transmitted through the router of the movement source network,
    generating a communication control message including the information regarding the movement destination network, and
    transmitting the communication control message to the correspondent node.

4. The method of claim 3, wherein:
    the communication control message transmitted to the correspondent node includes information that binds position information of the movement source network of the mobile node and position information of the movement destination network of the mobile node.

5. The method of claim 4, wherein:
    the information on the movement destination network includes one or more of information regarding a type of the movement destination network or a bandwidth of the movement destination network.

6. The method of claim 1, wherein:
    the mobile IP comprises Mobile IPv4 or Mobile IPv6.

7. The method of claim 1, wherein:
    the information regarding the movement destination network includes one or more of information regarding a type of the movement destination network or a bandwidth of the movement destination network.

8. A method to handover a mobile node between heterogeneous networks using a mobile internet protocol (IP), the method comprising:
    extracting by the mobile node information regarding a movement destination network from a reference message transmitted by the movement destination network;
    generating a communication control message including information regarding the movement destination network; and
    transmitting the information regarding the movement destination network from the mobile node without passing information through a router of a movement source network to a correspondent node that continuously transmits continuous data to the mobile node,
    wherein the information regarding the movement destination network includes information regarding a bandwidth of the movement destination network.

9. The method of claim 8, wherein:
    the mobile IP comprises Mobile IPv4 or Mobile IPv6.

10. The method of claim 8, wherein:
    the information regarding the movement destination network further includes information regarding a type of the movement destination network.

11. A method to handover a mobile node between heterogeneous networks using a mobile internet protocol (IP), the method comprising:
    receiving a message at an apparatus including information regarding a movement destination network to which the mobile node is currently connected from the mobile node without passing information through a router of a movement source network;
    extracting the information regarding the movement destination network from the message; and
    transmitting data from the apparatus receiving the message having a bandwidth adjusted according to the information regarding the movement destination network to the mobile node,
    wherein the handover occurs while continuously receiving data.

12. The method of claim 11, further comprising:
    transmitting the message to a correspondent node including information that binds position information of a movement source network of the mobile node and position information of the movement destination network of the mobile node.

13. The method of claim 12, further comprising:
    transmitting a response message to the message in response to receiving the message.

14. The method of claim 11, wherein the transmitting data having a bandwidth adjusted according to the information regarding the movement destination network to the mobile node enables transmission or reception of the data in a form corresponding to available bandwidths of the heterogeneous networks having different transfer rates, when the mobile node moves between the heterogeneous networks.

15. The method of claim 11, further comprising:
    transmitting a response message to the message in response to receiving the message.

16. The method of claim 11, wherein:
    the mobile IP comprises Mobile IPv4 or Mobile IPv6.

17. The method of claim 11, wherein:
the information regarding the movement destination network includes one or more of information regarding a type of the movement destination network or a bandwidth of the movement destination network.

18. An apparatus to handover a mobile node between heterogeneous networks using a mobile internet protocol (IP), the apparatus comprising:
a unit to connect the mobile node to a movement destination network;
a unit to obtain information regarding the movement destination network;
a unit to generate a message including the information regarding the movement destination network; and
a unit to transmit the information regarding the movement destination network without gassing information through a router of a movement source network of the mobile node to a correspondent node when the message including the information regarding the movement destination network is received at the router of the movement source network of the mobile node, the corresponding node continuously transmitting an amount of continuous data to the mobile node based on the received information regarding the movement destination network.

19. The apparatus of claim 18, wherein:
the message transmitted to the correspondent node includes information that binds position information of a movement source network of the mobile node and position information of the movement destination network of the mobile node.

20. The apparatus of claim 18, wherein:
the mobile IP comprises Mobile IPv4 or Mobile IPv6.

21. The apparatus of claim 18, wherein:
the information regarding the movement destination network includes one or more of information regarding a type of the movement destination network or a bandwidth of the movement destination network.

22. The apparatus of claim 18, wherein:
the message transmitted to the correspondent node includes information that binds position information of a movement source network of the mobile node and position information of the movement destination network of the mobile node; and
the information regarding the movement destination network includes one or more of information regarding a type of the movement destination network or a bandwidth of the movement destination network.

23. The apparatus of claim 22, wherein:
the transmission of the message is performed via a router of the movement source network of the mobile node.

24. An apparatus to handover a mobile node between heterogeneous networks using a mobile internet protocol (IP), the apparatus comprising:
a unit to extract information regarding a movement destination network from a reference message transmitted by the movement destination network;
a unit to generate a communication control message including information regarding the movement destination network; and
a unit to transmit the communication control message including the information regarding the movement destination network without gassing information through a router of a movement source network to a correspondent node that continuously transmits continuous data to the mobile node,
wherein the information regarding the movement destination network includes information regarding a bandwidth of the movement destination network.

25. The apparatus of claim 24, wherein:
the mobile IP comprises Mobile IPv4 or Mobile IPv6.

26. The apparatus of claim 24, wherein:
the information regarding the movement destination network further includes information regarding a type of the movement destination network.

27. An apparatus to handover a mobile node between heterogeneous networks using a mobile internet protocol (IP), the apparatus comprising:
a unit of a correspondent node to receive a message including information regarding a movement destination network to which a mobile node is currently connected from the mobile node;
a unit to extract the information regarding the movement destination network from the message without receiving information through a router of a movement source network; and
a unit of the correspondent node to transmit data having a bandwidth adjusted according to the information regarding the movement destination network to the mobile node,
wherein the correspondent node continuously transmits continuous data to the mobile node.

28. The apparatus of claim 27, wherein:
the message is transmitted to a correspondent node and includes information that binds position information of a movement source network of the mobile node and position information of the movement destination network of the mobile node.

29. The apparatus of claim 27, wherein transmitting the data having a bandwidth adjusted according to the information regarding the movement destination network to the mobile node enables transmission or reception of the data in a form corresponding to available bandwidths of the heterogeneous networks having different transfer rates, when the mobile node moves between the heterogeneous networks.

30. The apparatus of claim 27, wherein:
the mobile IP comprises Mobile IPv4 or Mobile IPv6.

31. The apparatus of claim 27, wherein:
the information regarding the movement destination network includes one or more of information regarding a type of the movement destination network or a bandwidth of the movement destination network.

32. The apparatus of claim 27, wherein:
the message is transmitted to a correspondent node and includes information that binds position information of a movement source network of the mobile node and position information of the movement destination network of the mobile node; and
the information regarding the movement destination network includes one or more of information regarding a type of the movement destination network or a bandwidth of the movement destination network.

33. A non-transitory computer-readable recording medium having embodied thereon a computer program to execute by a processor a method to handover a mobile node between heterogeneous networks using a mobile internet protocol (IP), the method embodied in the program comprising:
connecting the mobile node to a movement destination network;
obtaining information regarding the movement destination network;
generating a message including the information regarding the movement destination network; and transmitting the information regarding the movement destination network without passing information through a router of a movement source network of the mobile node to a correspondent node when the message including the information regarding the movement destination network is received at the router, the corresponding node continuously transmitting an amount of continuous data to the mobile node based on the received information regarding the movement destination network.

34. A non-transitory computer-readable recording medium having embodied thereon a computer program to execute by a processor a method to handover a mobile node between heterogeneous networks using a mobile internet protocol (IP), the method embodied in the program comprising:
- extracting by the mobile node information regarding a movement destination network from a reference message transmitted by the movement destination network;
- generating a communication control message including information regarding the movement destination network; and
- transmitting the communication control message from the mobile node without passing information through a router of a movement source network to a correspondent node that continuously transmits continuous data to the mobile node,
- wherein the information regarding the movement destination network includes information regarding a bandwidth of the movement destination network.

35. A non-transitory computer-readable recording medium having embodied thereon a computer program to execute by a processor a method to handover a mobile node between heterogeneous networks using a mobile internet protocol (IP), the method embodied in the program comprising:
- receiving a message at a correspondent node including information regarding a movement destination network to which the mobile node is currently connected from the mobile node without receiving information through a router of a movement source network;
- extracting the information regarding the movement destination network from the message; and
- transmitting data from the correspondent node having a bandwidth adjusted according to the information regarding the movement destination network to the mobile node,
- wherein the correspondent node continuously transmits continuous data to the mobile node.

36. A method to handover a mobile node between heterogeneous networks using a mobile internet protocol (IP), the method comprising:
- connecting the mobile node to a movement destination network;
- obtaining transfer rate information regarding the movement destination network;
- generating a message including the information regarding the movement destination network; and
- transmitting the information regarding the movement destination network without passing information through a router of a movement source network to a correspondent node that continuously transmits continuous data to the mobile node based on the received transfer rate information.

* * * * *